April 11, 1967 R. M. CARTER ETAL 3,313,368
SIDE FRAME MOUNT
Filed Sept. 15, 1965 3 Sheets-Sheet 3
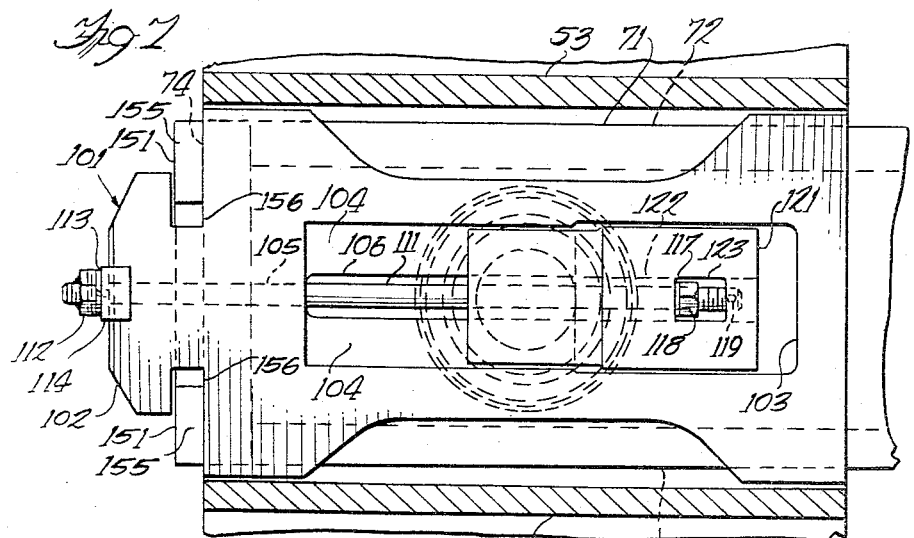
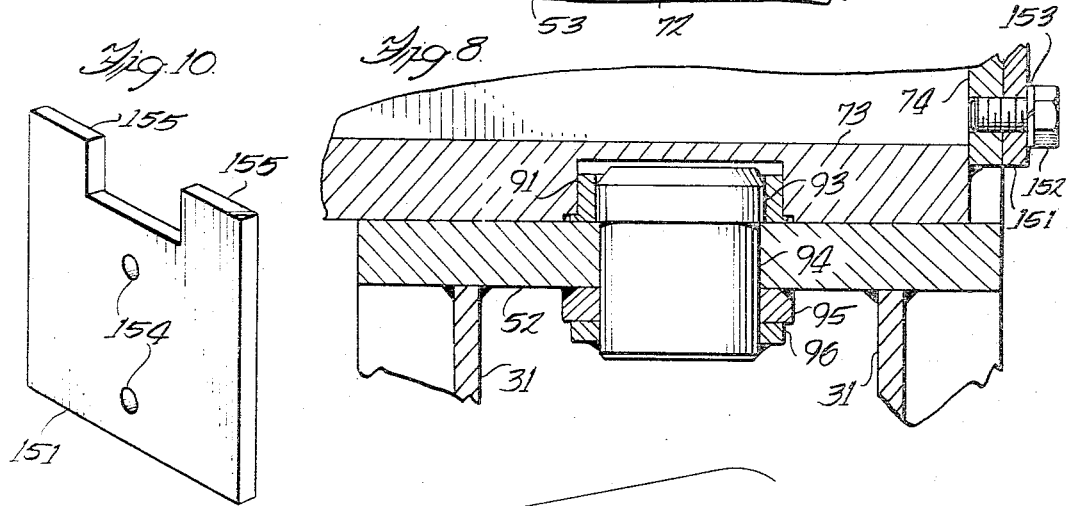
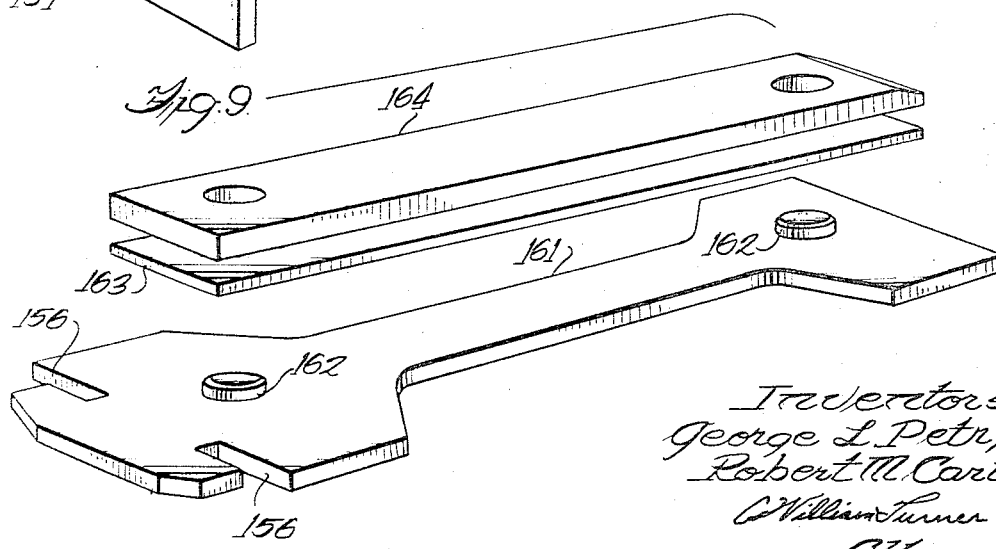
Inventors
George L. Petrik
Robert M. Carter
William Turner
Attorney United States Patent Office 3,313,368
Patented Apr. 11, 1967

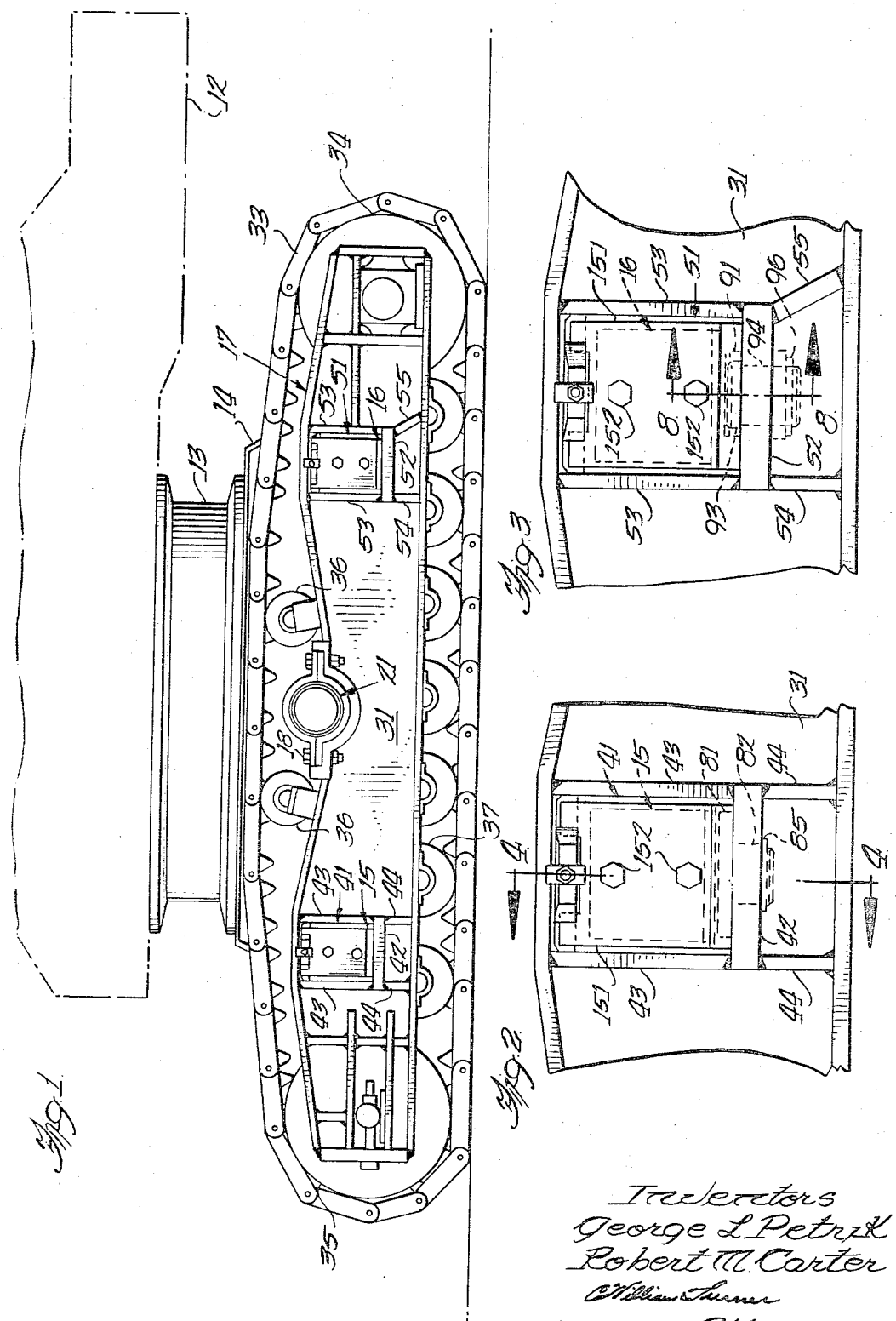

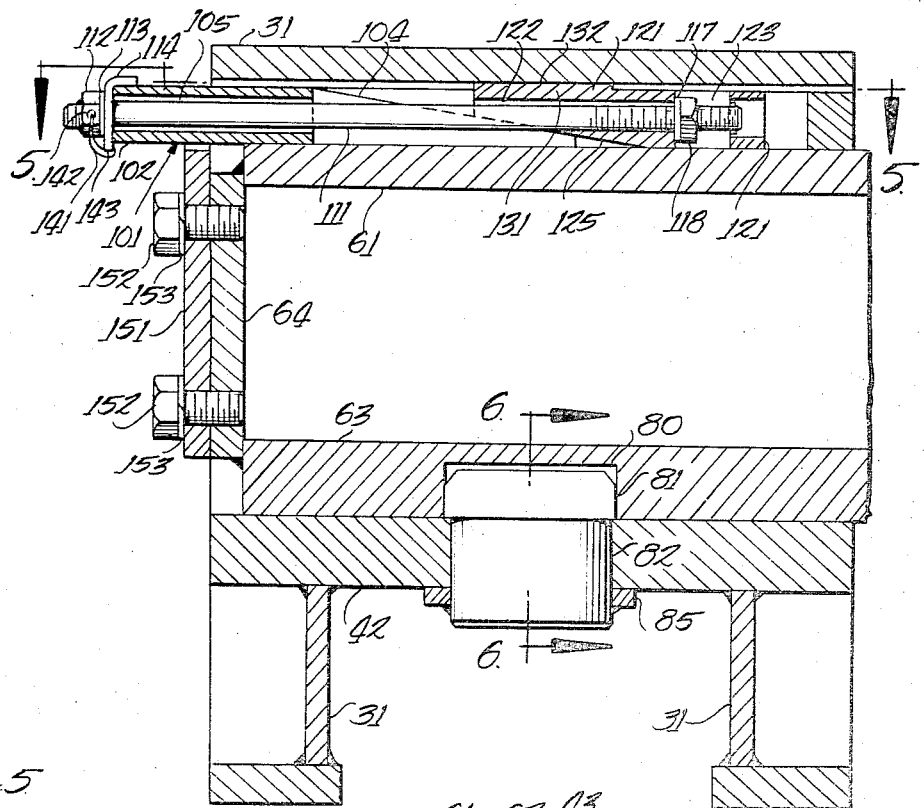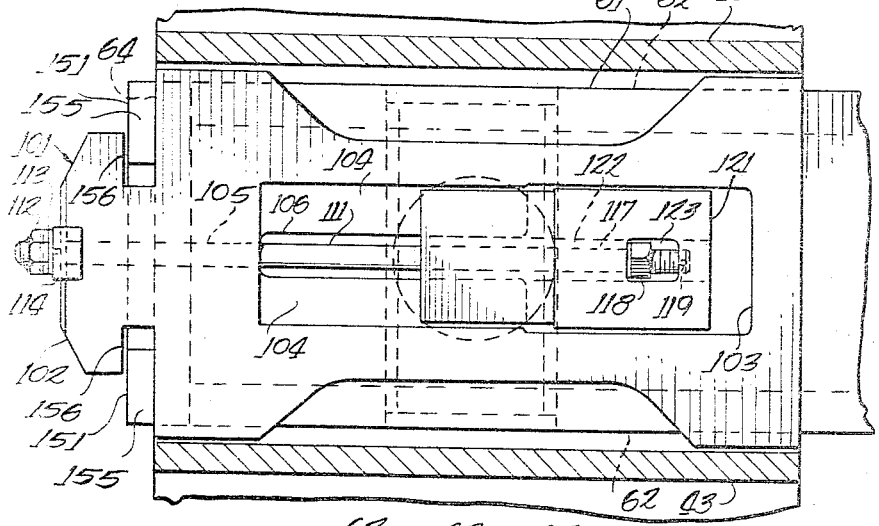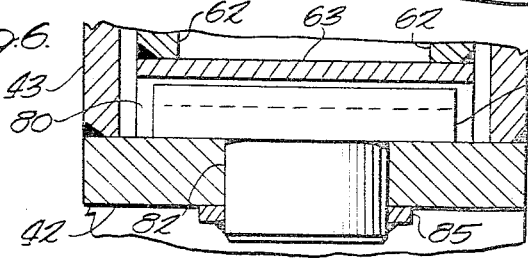

3,313,368
SIDE FRAME MOUNT
Robert M. Carter and George L. Petrik, both of Cedar Rapids, Iowa, assignors to Link-Belt Company, a corporation of Illinois
Filed Sept. 15, 1965, Ser. No. 487,409
9 Claims. (Cl. 180—9.2)

This invention relates generally to vehicles having side frames and more particularly to mechanized vehicles having side frames which may be readily attached to or removed from the axles of the vehicle undercarriage.

During the transportation of vehicles of this type it is frequently necessary to remove the side frames from the undercarriage of the vehicle so as to reduce the over all dimensions of the vehicle or to reduce the concentrated weight load on the transporting carrier. Due to the nature of this equipment it is essential that it be disassembled, to a new locality, and reassembled as quickly as possible so as to avoid repetitive time consuming tasks resulting in excessive and repetitive costs.

It is therefore a primary object of this invention to provide a new and improved apparatus by means of which the complete and intact side frames may be quickly and simply attached to and removed from the vehicle undercarriage axles so as to expedite the transportation of the vehicle from one locality to another by reducing the weight thereof, and also to reduce the over all dimensions of the vehicle so as to maintain the limited clearances required when transporting the vehicle over the highway or railway.

Another object of this invention is to allow replacement of the complete side frame assemblies so that normal maintenance and necessary repairs may be performed on the side frame assemblies under favorable shop conditions rather than adverse field conditions without involving the vehicle more than the few minutes it requires to replace a side frame assembly.

Another object of this invention is to allow ease of interchangeability of the complete side frame assemblies so as to allow a quick and convenient way whereby a side frame containing a particular type of track assembly may be interchanged with a side frame containing a different type of track assembly so as to expedite the transition between various work surfaces found at and around various construction sites.

Another object of this invention is to provide ample clearance for ease in assembling and disassembling the side frame assemblies to and from the axles of the vehicle undercarriage while providing a connecting element between the two which supplies a sturdy load bearing surface having no looseness between the axles and the side frame assemblies.

Another object of this invention is to provide for the accurate longitudinal and lateral alignment of the side frame assemblies relative to the vehicle body upon their attachment to the axles of the vehicle undercarriage.

Other objects and advantages of this invention will be apparent during the course of the following description.

In the accompanying drawings forming a part of the specification, and in which like reference characters are employed to designate like parts throughout the same:

FIGURE 1 is a side elevational view showing a crawler track side frame assembly mounted on the vehicle undercarriage axles.

FIGURE 2 is an enlarged fragmentary view of a portion of the side frame assembly illustrated in FIG. 1 showing the side frame mounting at the front axle.

FIGURE 3 is an enlarged fragmentary view of a portion of the side frame assembly illustrated in FIG. 1 showing the side frame mounting at the rear axle.

FIGURE 4 is an enlarged fragmentary sectional view taken on line 4—4 of FIG. 2.

FIGURE 5 is a fragmentary sectional view taken on line 5—5 of FIG. 4 showing the top plan view of the adjustable wedge assembly.

FIGURE 6 is an enlarged fragmentary sectional view taken on line 6—6 of FIG. 4.

FIGURE 7 is a cross-section view similar to FIG. 5 showing the adjustable wedge assembly associated with the rear axle mounting means.

FIGURE 8 is a fragmentary sectional view taken on line 8—8 of FIG. 3.

FIGURE 9 is a perspective view illustrating a shim assembly which may be used in place of the adjustable wedge assembly.

FIGURE 10 is a perspective view showing the retainer plate used with either the adjustable wedge assembly or the shim assembly.

In the drawings, wherein for the purpose of illustration are shown the preferred embodiments of this invention, and first particularly referring to FIGS. 1–3 inclusive, it will be seen that the vehicle body 12 is rotatably secured to the base 13 of the vehicle undercarriage assembly 14. The front axle assembly 15 and rear axle assembly 16 of the undercarriage 14 are secured to the side frame assemblies 17 which are located on opposite sides of the vehicle. The side frames 17 are identical except that one is left hand while the other is right hand in construction.

The propelling power is transmitted from the drive engine, not shown, located in the vehicle body 12 by a meshed gear system, not shown, connected to the side frame assembly 17. This drive connection uses spline connections in order to complete the connection to the traction head assembly 21 which is secured to the middle of the side frame assembly 17 by bolts 18 which may be shimmed to provide proper vertical alignment at the drive connection.

The side frame assembly 17 is a self contained unitary assembly consisting of a longitudinally extending side rail 31 which has a series of tread carrier roller units 36 on its upper side and tread carrier units 37 on its lower side. The tread carrier units 35 and 36 are used for supporting the tread 33 in its movement around the side rail 31. The tread 33 is trained over the idler sprocket 35 and is driven by the tread drive sprocket 34. This drive sprocket is driven by a chain or gear arrangement, not shown, which connects the drive sprocket to the traction head assembly 21 thereby transmitting the propelling power from the drive engine to the tread 33. The side rail 31 has a laterally extending from aperture 41 and a laterally extending rear aperture 51 for the mounting of axles 15 and 16 respectively. The aperture 41 is framed by the top of side rail 31, a bottom member 42, side members 43, and associated supports 44. All of the members and supports are welded both to the side rail 31 and to each other at their adjacent edges. The aperture 51 is of a similar construction to aperture 41, having a bottom member 52, side members 53, and supports 54 and 55.

Referring particularly to FIGS. 4–6 inclusive, the front axle assembly 15 is a rectangular or square beam projecting laterally from the undercarriage 14 and composed of top member 61, side members 62, lower member 63, and end plate 64, all members being welded together at their adjacent edges. The rear axle assembly 16 is of identical construction to the axle assembly 15 having top member 71, side members 72, lower member 73, and end plate 74.

The lower member 63 of the front axle assembly 15 has a rectangular keyway 80 which engages the rectangular head of a dowel 81. This dowel has a cylindrical shank 82 which is fitted into a hole in member 42. The washer 85 is then welded onto the cylindrical shaft thereby securing the dowel 81 to the member 42.

Referring particularly to FIGS. 7 and 8, circular bushing 91 is inserted into member 73 of the rear axle assembly 16 and may be replaced in the event that wear should occur.

This bushing is in surrounding engagement with the circular head of the dowel 93 having a cylindrical shank 94. This shank is fitted into a hole in member 52. The washer 96 is then welded to the shank and abuts on washer 95 which is welded to the underside of member 52.

The adjustable wedge assembly 101 consists of a bar 102, a shaft 111, and a moveable wedge 121. The bar 102 has a rectangular aperture 103, two machined inclined surfaces 104, and a cylindrical hole 105 and slot 106 forming a free passage for the routing of the shaft 111. Wedge 121 has a cylindrical hole 122 in alignment with hole 105 for the passage of shaft 111. The rectangular aperture 123 is of such a dimension so as to prevent the rotation of nut 118 when the shaft 111 is rotated. The inclined surface 125 of the wedge 121 is of a slope which corresponds with the inclined surfaces 104 of the bar 102 so that the vertical thickness of the wedge assembly 101 is increased by the longitudinal movement of the wedge 121. The top wedge surface 131 is constructed to abut against the under surface 132 of the top of side rail 31. Nut 112 is threaded onto one end of shaft 111 and is then welded to the shaft. The shaft 111 is then inserted through lock washer 113 and plate 114 into the wedge assembly 101. Nut 118 is then threaded onto the shaft 111 and is prevented from coming off the shaft by pressing a roll pin 119 into a diametric opening in the end of the shaft.

After the front axle 15 and rear axle 16 are inserted into the front and rear apertures 41 and 51, respectively, of the side frame assembly 17, and the keyway 80 and bushing 91 are properly seated over the rectangular head of dowel 81 and circular head of dowel 93 respectively, the adjustable wedge assemblies 101 are then inserted between the top of side rail 31 and the axle top member 61 and 71. The rectangular ears 155 of a retainer plate 151 (see FIG. 10) are inserted into the rectangular slots 156 in each bar 102. The retainer plates 151 are then secured to the end plates 64 and 74 by the cap screws 152. The cap screws are prevented from loosening by the use of lock washers 153. Wedge 121 is driven horizontally by rotating welded nut 112 which rotates shaft 111. The rotation of the shaft 111 causes the nut 118 to ride on the shaft so as to apply pressure to washer 117 thereby driving wedge surface 125 up the inclined surfaces 104 until the top wedge surface 131 tightly abuts against the under surface 132 of the top of side rail 31. The side frame assembly 17 is now securely mounted to axles 15 and 16 with the wedge assemblies 101 being used to prevent the vertical disengagement of the axles from the dowels 81 and 93. A wire 141 is passed through the diametric opening 142 in nut 112 and through opening 143 in plate 114. This wire is an extra precaution used to prevent the loosening of the wedge assembly 101.

To remove side frame assembly 17 from axles 15 and 16, the above process is reversed. Rotating the shaft 111 causes the wedge 121 to move down the inclined surfaces 104 thereby loosening the wedge assembly 101 and allowing it to be removed. The traction head assembly 21 is then disconnected from the drive mechanism of the vehicle and is stored in the side frame assembly 17. The appropriate side of the vehicle is then jacked into an elevated position at which axles 15 and 16 may be disengaged from the dowels 81 and 93 thus allowing the side frame assembly 17 to be removed from the axles.

A shim assembly, a preferred embodiment of which is shown in FIG. 9, may be used in place of wedge assembly 101. The shim assembly consists of a bar 161 having bosses 162 which engage corresponding openings in the shim stock 163 and shim bar 164 respectively. The shim stock 163 is available in a variety of thicknesses so that the proper thicknesses may be choesn to provide a shim assembly having a thickness which corresponds with the clearances available between the side rail 31 and the top members 61 and 71 of axles 15 and 16 respectively.

From the above description it is apparent that by using the cylindrical dowel 93 in rear aperture 51 and the rectangular dowel 81 in front aperture 41, the side frame assembly 17 may be easily aligned on the axles 15 and 16. This allows the side frame assembly 17 to be interchanged with another side frame assembly without the necessity of having to maintain close tolerances and accuracies during the manufacture and assembly of the side frame assembly. By the cylindrical dowel 93 in the rear aperture 51 preventing any lateral and longitudinal movement of the side frame assembly relative to the rear axle assembly 16, the traction head assembly 21 on the side frame assembly 17 is automatically properly aligned with its mating spline connection located on the vehicle undercarriage assembly 14. This system of mounting the side frame assembly 17 onto the axles 15 and 16 is very sturdy and much less vulnerable to damage, wear, and corrosion than a corresponding system which would use bolts and associated threaded holes to accomplish the same results.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, we claim:

1. Apparatus for attaching a side frame member to a vehicle undercarriage comprising:

longitudinally spaced axle means extending laterally from said vehicle undercarriage, a side frame member having apertures extending laterally therethrough for receiving said axle means, said axle means and said apertures in the side frame member having associated projections and recesses formed thereon intermediate the ends of said apertures for a fitted relationship when the side frame member is assembled on the axle means, said axle means and said apertures having clearance therebetween for the insertion of said axle means into said apertures and movement of the associated projections and recesses into said fitted relationship, and filler means detachably secured in fitted relationship with the clearance space between the assembled axle means and side frame member apertures for preventing displacement of said projections from their associated recesses.

2. Apparatus as defined in claim 1 further characterized by said filler means comprising:

a pair of elements having portions with opposed inclined surfaces arranged in vertically overlapped relationship, and means for imparting relative horizontal movement between the elements in a direction to increase the thickness of the overlapped portions of said elements to fill said clearance space.

3. Apparatus as defined in claim 2 further characterized by one of said pair of elements comprising:

a member having a vertical opening therethrough with an inclined surface at each side thereof, a second member positioned in said opening and being moveable relative to said first member, said second member having an inclined surface vertically overlapping and in engagement with said inclined surfaces of said first member, threaded means passing horizontally between the inclined surfaces of said first member and inserted through an aperture in said second member, means for rotating said threaded means, and means for attaching said threaded means to said second member to impart relative horizontal movement between said members along said inclined surfaces to increase the thickness of the overlapped members upon rotation of the threaded means for completely filling said clearance space.

4. Apparatus as defined in claim 1 further characterized by said filler means comprising:

means corresponding in thickness to said clearance space and inserted into the clearance space between the axle means and the associated aperture, and retainer means detachably securing said first mentioned means in a fixed position relative to said axle means and said side frame member.

5. Apparatus as defined in claim 1 further characterized by said filler means comprising:

an element having vertically extending bosses, shim means having openings extending vertically therethrough for receiving said bosses, the combined thickness of said element and the assembled shim means corresponding to said clearance space and said element and shim means being inserted into the clearance space between each axle means and its associated aperture, and retainer means detachably securing said element in a fixed position relative to said axle means and said side frame member.

6. Apparatus for attaching a side frame member to a vehicle undercarriage comprising:

longitudinally spaced axle means extending laterally from said vehicle undercarriage, a side frame member having apertures extending laterally therethrough for receiving said axle means, means mounted on said frame member and projecting into said apertures, said apertures having clearance for the insertion of said axle means thereinto past said projecting means, said axle means having recesses formed therein for receiving said projecting means in fitted relationship when the side frame member is assembled on the axle means, and filler means detachably secured in fitted relationship with the clearance space between the assembled axle means and side frame member apertures for preventing the displacement of said projecting means from the associated recesses of said axle means.

7. Apparatus for attaching a side frame member to a vehicle undercarriage comprising:

a pair of longitudinally spaced axle means extending laterally from said vehicle undercarriage, a side frame member having a pair of apertures extending laterally therethrough for receiving said axle means, means mounted on said side frame member and projecting into said apertures, said apertures having clearance for the insertion of said axle means thereinto past said projecting means, one of said axle means having an elongated recess formed therein for a fitted relationship with opposite sides of the projecting means in its associated aperture to allow only lonigtudinal movement when the side frame member is assembled on said axle means, the other said axle means having a recess formed therein for receiving in fitted relationship a projecting means of like shape in the associated aperture to prevent any longitudinal and lateral movement when the side frame member is assembled on the axle means, and filler means detachably secured in fitted relationship with the clearance spaces between the assembled axle means and side frame member apertures for preventing the displacement of said projecting means from their associated recesses.

8. Apparatus for attaching a side frame member to a vehicle undercarriage comprising:

a pair of longitudinally spaced rectangular axles extending laterally from said vehicle undercarriage, a side frame member having a pair of rectangular apertures extending laterally therethrough for receiving said axles, means mounted on the lower surfaces of said apertures and projecting vertically into the apertures, said apertures having vertical clearance for the insertion of said axles thereinto past said projecting means, one of said axles having an elongated recess formed in its lower surface for a fitting relationship with opposite sides of the projecting means on the lower surface of its associated aperture to allow only longitudinal movement therebetween when said side frame member is assembled onto said axles, the other side axle having a recess formed in its lower surface corresponding in shape and size with the projection on the lower surface of its associated aperture to prevent any longitudinal and lateral movement between the side frame member and the axle after assembly, filler means fitted into the clearance space between the top of each axle and its associated aperture to prevent the vertical disengagement of said projecting means from the associated recesses, and retainer means detachably securing the filler means in fixed positions relative to said axles and said side frame member.

9. Apparatus for attaching a side frame member to a vehicle undercarriage comprising:

a pair of longitudinally spaced rectangular axles extending laterally from said vehicle undercarriage, a side frame member having a pair of apertures extending laterally therethrough for receiving said axles, a dowel mounted on the lower surface of each said aperture and projecting vertically thereinto, said apertures having vertical clearance for the insertion of said axles thereinto past said projecting dowels, one of said axles having a rectangular recess formed in its lower surface for a fitted relationship with opposite sides of the projecting dowel on the lower surface of its associated aperture to allow only longitudinal movement therebetween when said side frame member is assembled onto said axles, the other said axle having a cylindrical recess formed in its lower surface corresponding in shape and size with the projecting dowel on the lower surface of its associated aperture to prevent any longitudinal and lateral movement between the side frame member and axle after assembly, a filler assembly fitted into the clearance space between the top of each axle and its associated aperture to prevent the vertical disengagement of each projecting dowel from its associated recess, and retainer means detachably securing the filler assemblies in fixed positions relative to said axles and said side frame member.

References Cited by the Examiner

UNITED STATES PATENTS

| | | | |
|---|---|---|---|
| 1,875,052 | 8/1932 | Ljungkull | 180—9.2 X |
| 2,681,231 | 6/1954 | Kondracki | 180—9.48 |
| 2,784,015 | 3/1957 | Swanson | 287—119 |
| 3,037,571 | 6/1962 | Zelle | 180—9.48 |

BENJAMIN HERSH, *Primary Examiner.*

R. J. JOHNSON, *Assistant Examiner.*